United States Patent [19]

Breneman et al.

[11] Patent Number: 5,338,352
[45] Date of Patent: Aug. 16, 1994

[54] PROCESS FOR THE EMULSIFICATION OF POLYDIMETHYL SILOXANE OILS, ORGANOMODIFIED SILOXANE OILS AND ORGANIC OIL USING NON-IONIC SURFACTANTS

[75] Inventors: William C. Breneman, Sistersville; William C. Crane, Friendly, both of W. Va.; Michael J. Walsh, Marietta; Eric A. Warren, Coolville, both of Ohio

[73] Assignee: OSi Specialties, Inc., Danbury, Conn.

[21] Appl. No.: 59,819

[22] Filed: May 10, 1993

Related U.S. Application Data

[63] Continuation-in-part of Ser. No. 801,517, Dec. 2, 1991, Pat. No. 5,234,495.

[51] Int. Cl.$^5$ .................................................. C09D 7/12
[52] U.S. Cl. .............................. 106/285; 106/287.15; 106/287.16; 366/348; 252/314
[58] Field of Search ............... 106/285, 287.16, 287.15; 252/314; 366/348

[56] References Cited

U.S. PATENT DOCUMENTS

| | | | |
|---|---|---|---|
| 4,273,584 | 6/1981 | D'Angelo et al. | 106/3 |
| 4,509,981 | 4/1985 | Sanders, Jr. et al. | 106/3 |
| 4,620,878 | 11/1986 | Gee | 106/287.15 |
| 4,743,648 | 5/1988 | Hill et al. | 524/731 |
| 4,757,106 | 7/1988 | Mayer et al. | 524/262 |

*Primary Examiner*—David Brunsman
*Attorney, Agent, or Firm*—Andrew S. Reiskind

[57] ABSTRACT

A process for preparing an oil-in-water emulsion is provided, which process comprises mixing and heating a water-insoluble organomodified polysiloxane oil or an organic oil, an organomodified silicone emulsifier, water and an alkaline metal salt above the cloud point of the emulsifier under agitated conditions and cooling the resulting mixture below the cloud point.

13 Claims, No Drawings

PROCESS FOR THE EMULSIFICATION OF POLYDIMETHYL SILOXANE OILS, ORGANOMODIFIED SILOXANE OILS AND ORGANIC OIL USING NON-IONIC SURFACTANTS

This is a continuation-in-part of Ser. No. 07/801,517 filed Dec. 2, 1991 now U.S. Pat. No. 5,234,695.

BACKGROUND OF THE INVENTION

1. Field of the Invention

The present invention is directed to a process for preparing an oil-in-water emulsion. More particularly, the present invention is directed to a process for preparing a stable off-in-water emulsion of fine particle size which is useful in making emulsions for use in woven and non-woven textiles, cosmetic, personal care and pharmaceutical applications.

2. Prior Art

U.S. Pat. No. 4,620,878 describes a method for making a polyorganosiloxane fine emulsion or microemulsion. In this method a translucent oil concentrate is prepared. The concentrate is rapidly dispersed in water by the incremental addition of water to the concentrate to form an oil-in-water fine or microemulsion using high-shear mixing. This patent explicitly teaches: "When a single nonionic surfactant is employed as the insoluble surfactant, the cloud point of the surfactant should be higher than the temperature at which the emulsion is prepared." (Col. 9, lines 37-40).

S. Friberg, and K. Shinoda, *Emulsions and Stabilization* (John Wiley & Sons, 1986), report two distinct methods of emulsion preparation: Emulsification by the Phase Inversion Temperature (PIT) Method and Emulsification by the Inversion Process (IP). PIT emulsification involves preparing an emulsion near (just below) the phase inversion temperature of the system. The phase inversion temperature is a characteristic property of an emulsion (rather than of the surfactant alone) at which the hydrophile-lipophile property of the non-ionic surfactant is in balance (i.e., the temperature of the emulsion at which the surfactant has an equal affinity for both the oil and water phases of the emulsion). According to the PIT method, desired emulsions are obtained if an emulsion system is initially emulsified just below the PIT and then cooled rapidly, since interfacial tension is reduced at the PIT and rapid cooling adds small droplets from the initial phase separation of the surfactant.

In the IP method of Friberg and Shinoda, emulsification is performed at a temperature higher than the PIT in order to first form a water-in-oil emulsion which then inverts to an oil-in-water emulsion upon cooling below the PIT. That is, Friberg and Shinoda emphasize either conducting the emulsification close to or slightly below the cloud point (PIT) or forming a water-in-oil emulsion at elevated temperature which is then inverted upon cooling (IP).

Surprisingly, it has been found that, by the process of the present invention, oil-in-water emulsions are easily obtained without the temperature constraints of the prior art methods. Further, the degree of mechanical agitation or work required to prepare the emulsion is significantly reduced by the process of this invention as compared to the above-mentioned processes in the art. Additionally, the process of the present invention permits the manufacture of emulsions which have a low bio-burden, since the emulsion is optionally pasteurized during preparation, thereby reducing the bio-burden that must be overcome by the addition of antimicrobial preservatives. Further, the process of the present invention produces stable (i.e., shelf life or storage life of at least two weeks) oil-in-water emulsions having a fine particle size.

SUMMARY OF THE INVENTION

The present invention provides a process for preparing an oil-in-water emulsion comprising mixing and heating (i) a water-insoluble organomodified polysiloxane oil, (ii) an organomodified silicone emulsifier, (iii) water, and (iv) an alkaline metal salt, above the cloud point of the emulsifier and cooling the resulting mixture below the cloud point of the emulsifier. The mixing and heating steps can be carried out either sequentially or simultaneously.

DETAILED DESCRIPTION OF THE INVENTION

The Process of Preparing the Emulsion

In preparing emulsions by the process of the present invention, the order of addition of the individual components is not critical, and, hence, they can be charged to a mixing vessel in any desired order. Mixing and heating of the components are performed simultaneously or sequentially. Preferably, mixing and heating takes place sequentially. By mixing and heating sequentially is meant that the components are mixed prior to heating.

The components are initially mixed, preferably blended, under agitated conditions such that a major portion of the non-aqueous components (i.e., the oil and the emulsifier) does not form a visible oil layer on the surface or top of the mixture or blend, but rather is suspended in the liquid prior to heating the mixture.

When the components are mixed or blended prior to heating, the rate and/or type of agitation is not critical and is generally less strenuous than that applied during heating. Any well known means of moving the bulk of the mixture in the vessel is suitable to provide agitation that is applied prior to heating. Agitation prior to heating is conveniently and conventionally accomplished by use of, for example, low shear mixing (also known as "bulk mixing") and can be accomplished by use of, for example, a marine propeller, an anchor style paddle, or flat-bladed turbine. Such low shear mixing or agitation causes a volumetric displacement of between about 0.2 liter/minute/liter of mixture up to about 16 liter/minute/liter of mixture, preferably between about 1 to 10 liter/minute/liter of mixture, and, for example, most preferably about 2.8 liter/minute/liter of mixture as described by J. Y. Oldshue in *Fluid Mixing Technology* (McGraw-Hill, 1983) at page 89.

After the mixing step, or simultaneously along with the mixing, the mixture is heated. For the purpose of forming an emulsion, without pasteurization of the emulsion, the mixture is heated under agitated conditions to a temperature of at least 5° C., preferably 10° C., and most preferably 15° C. or more above the cloud point of the water-soluble organomodified polysiloxane emulsifier. By "cloud point" is meant the temperature at which one gram of the polysiloxane emulsifier becomes insoluble in a 99-ml water solution. In general, heating in order to form an emulsion is conducted at the desired temperature for a time period sufficient to form the emulsion. Such time period ranges, for example, between about 2 minutes and 2 hours, preferably between about 2 minutes and 1 hour, and most preferably between about 5 minutes and 30 minutes. In general, the temperature during the heating step ranges from about 25° C. to 100° C., preferably from about 40° C. to 90° C., and most preferably from about 45° C. to 70° C.

Agitation during heating in the process of the present invention is critical and is conducted using any means known in the art to effect the intimate contact of and/or intermingling of the water insoluble phase (i.e., the oil and the emulsifier). For example, high shear mixing or agitation is accomplished by use of a shear type mixer such as a fiat plate impeller with sawtooth edges, a rotor stator mixer, tapered fiat blade radial impeller or bar turbine as described by J. Y. Oldshue in *Fluid Mixing Technology* (McGraw-Hill, 1983) at page 59. Other mechanical means known in the art can be employed to impart the desired shear mixing such as by use of a colloid mill, sand mill, or rotor stator as described by P. Sherman, ed., in *Emulsion Science* (McGraw-Hill, 1968) at page 9. When the mixture is heated to the desired temperature, high shear mixing or agitation is applied, for example, to impart a maximum shear rate of between about 450 sec.$^{-1}$ to 1050 sec.$^{-1}$, preferably between about 500 sec.$^{-1}$ to 1000 sec.$^{-1}$, and most preferably between about 650 to 950 sec.$^{-1}$.

Alternatively, agitation during heating can be described in terms of impeller speed. In the process of the present invention, this impeller speed ranges, for example, from about 2.6 to 12 meters/second, preferably about 5.2 to 7.2 meters/second, and most preferably about 5.5 to 7 meters/second.

Heating and agitation of the mixture results in the formation of an oil-in-water gel-like emulsion of small or fine particle size (less than about 0.3 microns), as evidenced by a clear to translucent appearance and a low electrical resistance (less than about 54 kilohms).

Optionally and advantageously, in a preferred embodiment of the process of the present invention, the mixture can be pasteurized. By "pasteurization" is meant the partial sterilization of the mixture conducted at a temperature and for a period of time, sufficient to destroy objectionable organisms without greatly affecting the chemical composition of the mixture. To achieve pasteurization, a mixture is heated to a desired temperature and maintained at that temperature for a period of time sufficient to bring about the destruction of bacteria or other organisms. Time-temperature equivalents necessary to effect pasteurization are well-known in the art and are described, for example, by G. F. Reddish, ed., in *Antiseptic, Disinfectants, Fungicides and Chemical and Physical Sterilization*, 2nd Edition (Lea & Febiger, 1957) at page 958. In general, according to this reference, pasteurization takes place, for example, at 60° C. in about 63 minutes or at 80° C. for a time period of at least about 0.4 seconds.

In the process of the present invention, pasteurization takes place as part of the heating step or as a separate step after the mixture has been heated and/or cooled. Preferably pasteurization occurs as part of the heating step. In this latter mode of operation, pasteurization occurs at a temperature above the cloud point of the emulsifier. When pasteurization is practiced in the process of the present invention, in general, the mixture is heated to about 65° C. to 75° C. for a time period of at least about 6 minutes, preferably about 70° C. to 75° C. for a time period of at least about 38 seconds.

After heating with or without pasteurization, the mixture is cooled below the cloud point of the organomodified silicone emulsifier and, more specifically, to ambient temperature. In the process of the present invention, the gel which is translucent disperses upon cooling below the cloud point of the organomodified silicone emulsifier without any agitation. However, while agitation is not required during cooling to produce the emulsion, some agitation is preferred. The agitation is conveniently provided by means of the aforementioned low shear or (bulk) mixing or volumetric displacement agitation described above to initially mix or blend the starting components. Agitation during cooling in the process of the invention serves to facilitate heat exchange with the environment. Another alternative to no agitation or slight agitation (such as low shear mixing), is to continue the high shear mixing conditions employed during the heating step during cooling to facilitate heat exchange or aid in the dispersion of the concentrate or gel phase. Upon cooling, the translucent gel disperses, and an oil-in-water emulsion is formed. The emulsion is milky white with a blue cast.

Alternatively, in one embodiment of the process of the present invention, the ingredients may be mixed such that there exists no free aqueous phase above the cloud point of the emulsifier. In other words, the quantity of water in the initial mixture is not greater than the amount which is present in the oil-in-water gel that is formed at or above the cloud point. After completing the mixing and heating as described above to produce the gel, the gel is cooled below the cloud point, preferably to ambient temperature. As the gel is cooled, or after reaching ambient temperature, additional water is added to fore the stable emulsion, preferably a stable fine emulsion having a particle size of less than about 0.6 microns.

In general, in the gel, the weight ratio of the water-insoluble organomodified polysiloxane oil to the organomodified emulsifier ranges from about 0.1:1 to 10:1, preferably from about 0.1:1 to 5:1, and most preferably from about 0.1:1 to 1.2:1. As is generally known in the art, the amount of water that is incorporated into the gel is dependent upon the hydrophobicity of the particular oil and the oil to emulsifier ratio. For example, it is known that as the oil to emulsifier ratio is lowered, the amount of water incorporated into the gel increases to a fixed amount determined by the particular oil and/or emulsifier employed. Water in excess of the fixed amount cannot be incorporated into the gel, and it remains in a separate aqueous phase.

When other additives are employed in the process of the present invention, such additives are usually present in the gel and/or final emulsion in amounts up to about 6% by weight of the gel or of the emulsion.

Water-Insoluble Organomodified Polysiloxane Oil

The water-insoluble organomodified polysiloxane oil employed in the present invention is more particularly defined by the Formula I:

$$R_3SiO(R_2SiO)_a(RQSiO)_bSiR_3 \qquad (I)$$

wherein:

R is hydroxyl or a monovalent hydrocarbon group including alkyl, aryl and aralkyl groups having no more than 10 carbon atoms. The R groups may be the same as or different from one another, and are illustrated by OH, methyl, ethyl, butyl, hexyl, phenyl and benzyl. Of these, the lower alkyls ($C_1$–$C_4$) are preferred. Most preferably, R is methyl. In Formula I, the average value of $\underline{a}$ is from one up to 5000, and is usually at least 10 and not more than 500. Parameter $\underline{b}$ is a number having an average value from 1 to 100, usually not exceeding 50. Preferably, the average value of each of $\underline{a}$ and $\underline{b}$ does not exceed 350.

The Q group of Formula I comprises one or two amino groups, and may also contain hydroxyl substitution. More particularly, Q has the general Formula II:

wherein:

X is an alkylene group having one to eight carbon atoms such as, for example, methylene, ethylene, propylene or hexylene, and preferably has two to four carbon atoms;

X' is a divalent organic radical including alkylene of one to four carbon atoms (such as, for example, methylene, ethylene and propylene) or phenylene or preferably oxypropylene (i.e., —$C_3H_6O$—, the oxygen of which is bonded to a carbon atom of the Y group);

Y is a hydroxyl-substituted acyclic alkylene group of two to eight carbon atoms and is illustrated by 2-hydroxypropylene, i.e., —$CH_2CH(OH)CH_2$—, or Y is a hydroxyl-substituted cyclic alkylene group having no more than eight carbon atoms as illustrated by 2-hydroxycyclohexylene, i.e.,

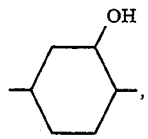

of which the acyclic groups having two to four carbon atoms are preferred;

$\underline{d},\underline{e}$, and $\underline{f}$ are zero or one provided the sum of $\underline{d}+\underline{e}$ is one and the sum of $\underline{e}+\underline{f}$ is zero or two; and $R^1$ and $R^2$ are independently hydrogen or an alkyl having from one to eight carbon atoms of which lower alkyls ($C_1$–$C_4$) are preferred, or a hydroxyalkyl group having from two to four carbon atoms, or an alkyleneamino group.

The alkyleneamino group within the scope of $R^1$ and $R^2$ of Formula II in turn has the following Formula III:

wherein:

$R^3$ and $R^4$ are independently hydrogen, alkyl or hydrogen as defined above with reference to $R^1$ and $R^2$; and $\underline{g}$ is an integer from two to eight, preferably no more than four.

From the above, it is evident that the amino-containing group, Q, can be a mono- or diamino group of the following types where the specific groups shown for X, X', Y and $R^1$–$R^4$, and the value of $\underline{g}$ are selected for illustrative purposes only:

—$C_3H_6NH_2$
—$C_3H_6N(C_2H_5)_2$
—$C_3H_6N(CH_2CH_2OH)_2$
—$C_3H_6N(CH_3)CH_2CH_2NH_2$
—$C_3H_6NHCH_2CH_2NH_2$
—$C_3H_6O$—$CH_2CH(OH)CH_2NH_2$
—$C_3H_6$—$N(CH_2CH_2OH)(CH_2CH_2NH_2)$
—$C_3H_6O$—$CH_2CH(OH)CH_2N(H)CH_2CH_2NH_2$

It is to be understood that the amino groups encompassed by Formulas II and III may be used in their protonated or quaternized form without departing from the scope of this invention.

The preparation of organomodified polysiloxane oils is well-known in the art. Such methods are described in U.S. Pat. No. 4,184,004 and *Silicon and Silicones*, E. G. Rochow, (Springer & Verlag, 1987) at page 97.

Organic Oil

Optionally, in one embodiment of the process of the present invention the polysiloxane oil can be replaced by an organic oil, such as, for example, mineral oil. Organic oils suitable for use in the process of the present invention can include mineral oils such as those set forth in *U.S. Pharmacopeia XXII, NF XVII*, Jan. 1, 1990 edition (United States Pharmacopeia Convention Inc.: Rockville, Md. 20852) and defined as "Topical Light Mineral Oil" and "Mineral Oil." In general, these mineral oils are linear or branched extreme hydrotreated and solvent refined petroleum oils having the general formula:

$$C_nH_{2n+2}$$

wherein $\underline{n}$ is an integer ranging in value from about 10 to about 50. The molecular weight of these oils can range from about 300 to 650 and preferably is 300 to 350. The viscosity of suitable oils for use in the process ranges from about 10 centistoke to about 3000 centistoke and preferably ranges from 10 to 60, most preferably from 10 to 34 centistoke.

Organomodified Silicone Emulsifier

The organomodified silicone emulsifier used in the present invention is a polyether-modified polysiloxane more particularly defined by the following Formula IV:

$$R^5_3SiO(R^5_2SiO)_p(R^5ESiO)_qSiR^5_3 \qquad (IV)$$

wherein:

$R^5$ is a monovalent hydrocarbon group including alkyl, aryl and aralkyl groups having no more than 10 carbon atoms. The $R^5$ groups may be the same as or different from one another, and are illustrated by methyl, ethyl, butyl, hexyl, phenyl and benzyl. Of these, the lower alkyls ($C_1$–$C_4$) are preferred. Most preferably, $R^5$ is methyl. It is within the scope of this invention that the $R^5$ group may additionally comprise an ethylcyclohexylenemonoxide (i.e.,

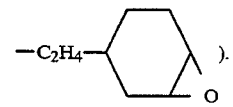

When the latter group is present, it comprises only a minor portion of the $R^5$ groups along the polysiloxane chain. In formula IV, $\underline{p}$ has a value ranging from about 10 to 150, preferably about 25 to 100, and most preferably, about 65 to 85. Parameter $\underline{q}$ has a value ranging from about 3 to 12, preferably about 4 to 10, and most preferably about 5 to 8.

The polyether group, E, of the polyether modified polysiloxanes used in the present invention more particularly have the following general Formula V:

$$-C_xH_{2x}(OC_2H_4)_y(OC_3H_6)_zOR^6 \quad (V)$$

in which $x$ has a value from one to eight, and usually has a value from two to four and preferably is three, $y$ is a positive number; and $z$ is zero or a positive number. However, the number of oxyethylene units in the polyether chain must be sufficient to render the emulsifier water soluble. It is to be understood that when $z$ is a positive number, the oxyethylene and oxypropylene units may be distributed randomly throughout the polyether chain or in respective blocks of oxyethylene and oxypropylene units or a combination of random and block distributions.

The $R^6$ group of Formula V is hydrogen, an alkyl group having from one to eight carbon atoms, or acyl group having from two to eight carbon atoms. When $R^6$ is alkyl, it is preferably a lower alkyl ($C_1$–$C_4$) such as methyl. When $R^6$ is an acyl group, it is preferable that it have no more than four carbon atoms such as, in particular, acetyl,—$C(O)CH_3$. It is believed that when the $OR^6$ terminal group of the polyether chain is acetoxy, some of the acetoxy groups of the amino-, polyether-modified polysiloxane undergo reaction to form amide linkages.

Preferably the total molecular weight of the oxyalkylene portion of the polyether group, E, is from about 200 to 10,000 and, most preferably, is from about 350 to 4,000. Thus the values of $y$ and $z$ can be those numbers which provide molecular weights within these ranges. However, the number of oxyethylene units in the polyether chain must be sufficient to provide an aqueous cloud point of the polyether-modified polysiloxane emulsifier of between 25° C. and 90° C., preferably between 40° C. and 90° C., and most preferably between 40° C. and 70° C.

The preparation of organomodified polysiloxanes emulsifiers is well-known in the art. One such method is described in U.S. Pat. No. 4,847,398.

Alkaline Metal Salt

In the process of the present invention, an alkaline metal salt is combined with the water-insoluble organomodified polysiloxane oil, organomodified silicone emulsifier and water. Preferably, the alkaline metal salt is a water soluble inorganic salt of an alkali or alkaline earth metal. In a preferred embodiment, the salt is contained in or dissolved in the water prior to being combined with the oil and emulsifier. In general, the alkaline metal salt is present in the mixture in an amount of at least 50 parts per million and less than 10,000 parts per million (ppm), preferably about 100 ppm to 500 ppm, and most preferably about 150 ppm to 300 ppm by weight of the mixture. The alkaline metal of the inorganic salt can be sodium, potassium, cesium, lithium, calcium, magnesium or mixtures thereof. Of these, sodium and potassium are preferred, with sodium being the most preferred. Water soluble inorganic sodium salts include sodium chloride, sodium carbonate, sodium bicarbonate, sodium phosphate, sodium biphosphate, sodium sulfate and sodium bisulfate. Among these, the preferred sodium salts are sodium chloride, sodium carbonate and sodium bicarbonate, with sodium bicarbonate being the most preferred.

Water soluble inorganic potassium salts include potassium chloride, potassium carbonate, potassium bicarbonate, potassium phosphate, potassium biphosphate, potassium sulfate and potassium bisulfate. Among these, the preferred potassium salts are potassium chloride, potassium carbonate, and potassium bicarbonate, with potassium bicarbonate being the most preferred.

Cesium, lithium, calcium and magnesium salts such as the chloride, carbonate, bicarbonate, phosphate, biphosphate, sulfate and bisulfate salts thereof are also employable in the process of the present invention but are generally less readily available and more expensive. Additionally, cesium and lithium salts are potentially toxic for some applications.

Other Additives

Optionally, other additives such as organic emulsifiers, preservatives or biocides, water soluble pigments or dyes, fragrances, fillers, pH adjustors, and/or antifoamers or defoamers can be included in the emulsion. One or more of these additives may be added during the process of preparation or added to the final emulsion.

Examples of organic emulsifiers include, but are not limited to, Tergitol TM 15-S-3, 15-S-15 and mixtures thereof (available from Union Carbide Chemicals and Plastics Company Inc.). While such organic emulsifiers are routinely incorporated in emulsion formulations, such emulsifiers are not necessary in the process of the present invention. That is, emulsions prepared by the process of the present invention are stable without the addition of such emulsifiers.

Examples of antimicrobial preservatives include Phenonip TM (available from NIPA Laboratories, Inc., Wilmington, Del.), Parasepts TM (available from Kalama Chemical, Inc., Seattle, Wash.), Giv-Gard TM DXN (available from Givaudan Corporation, Clifton, N.J.), Nuosept TM 95 (available from Nuodex Inc., Piscataway, N.J.) and UCARCIDE TM 250 (available from Union Carbide Chemicals and Plastics Company Inc.)

Examples of pH adjustors include mineral acids such as hydrochloric acid, phosphoric acid and sulfuric acid, and/or organic acids such as acetic acid, citric acid and the like.

Examples of antifoamer/defoamer additives include, for example, a silicone antifoamer such as SAG TM 2001 available from Union Carbide Chemicals and Plastics Company Inc.

Whereas the scope of the present invention is set forth in the appended claims, the following specific examples illustrate certain aspects of the present invention and, more particularly, point out methods of evaluating the same. It is to be understood, therefore, that the examples are set forth for illustration only and are not to be construed as limitations on the present invention. All parts and percentages are by weight unless otherwise specified.

The analytical procedure for determining a cloud point is well known in the art. For example, a one-gram sample (emulsifier) is dissolved in 99-milliliters of distilled water in a 150-ml beaker containing a 1-inch plastic coated stirrer bar. The beaker is placed on a combination stirrer/hot plate. A 0° C.-to-100° C. thermometer is suspended in the solution with the bulb of the thermometer placed ½-inch from the bottom of the beaker. With mild stirring, the solution is heated at a rate of 1° C. to 2° C. per minute. The temperature at which the submerged portion of the thermometer is no longer visible is recorded as the cloud point.

In the examples, particle size determination was performed using a Microtrac Model 7995-30 (Leeds and Northrup, Pittsburgh, Pa.) which measures light from a laser beam projected through a stream of particles. The angular distribution of the scattered light is a function of particle size which is analyzed by a computer.

A Sartorius Model YTC-01L analyzer (Sartorius, Hayward, Calif.) was used in the examples to determine the percentage of solids. The analyzer uses an infrared light source as a drying agent and a computer integrated balance. The percentage of solids is calculated by computer using the difference in sample weight before and after drying.

In the examples, samples were visually observed in four or eight-ounce jars for color/cast of the emulsion.

The following designations used in the Examples and elsewhere herein have the following meanings:

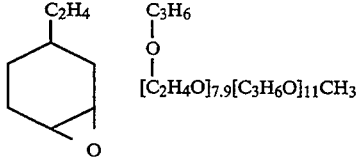

| Polysiloxane | Structure |
|---|---|
| Oil #1 | $(CH_3)_3SiO[(CH_3)_2SiO]_{250}Si(CH_3)_3$ |
| Oil #2 | $(CH_3)_3SiO[(CH_3)_2SiO]_{100}[CH_3SiO]_1Si(CH_3)_3$ with pendant $C_3H_6$—NH—$C_2H_4NH_2$ |

Emulsifier I:
$(CH_3)_3SiO[(CH_3)_2SiO]_{85}[CH_3SiO]_{2.2}[CH_3SiO]_{5.5}Si(CH_3)_3$ with $C_2H_4$-cyclohexyl and $C_3H_6$—O—$[C_2H_4O]_{7.9}[C_3H_6O]_{11}CH_3$ substituents Emulsifier II:
$(CH_3)_3SiO[(CH_3)_2SiO]_{65}[CH_3SiO]_{7.5}Si(CH_3)_3$ with $C_3H_6$—O—$[C_2H_4O]_{6.4}[C_3H_6O]_{2.1}H$

EXAMPLE 1

In order to illustrate the process of the present invention for making an emulsion, 214.8 grams of Emulsifier I having a cloud point of 38° to 42° C. and 214.8 grams of Oil #2 were charged to a three-necked round bottom flask equipped with an air-driven stirrer, condenser, and a temperature controller. Oil #2 was insoluble in Emulsifier I. The two components were blended together using the stirrer to agitate the blend. While maintaining the agitation, 623.3 grams of tap water (i.e., having an alkaline metal salt or salts dissolved therein), 12.5 grams of nonionic surfactant Tergitol 15-S-15 (a polyethylene glycol ether of a linear alcohol having 11 to 15 carbon atoms) and 8.6 grams of nonionic surfactant Tergitol 15-S-3 (a polyethylene glycol ether of a linear alcohol having 11 to 15 carbon atoms) were charged to the flask.

After the above components were charged and agitated, the mixture was heated and pasteurized by maintaining the mixture at 80° C. for a period of about 30 minutes. As the contents of the flask were heated, it was observed that a viscous concentrate (gel) formed as the cloud point (38°-42° C.) of Emulsifier I was reached and surpassed. The concentrate appeared to: have incorporated the Tergitol surfactants and the amino-modified polydimethylsiloxane oil without taking in much water (i.e., less than about 50% of the water was incorporated into the concentrate).

A solids analysis was made on both the water phase and on the concentrate phase. The water phase contained 0.6% solids and the concentrate contained 70 to 75% solids. The flask was cooled by removing the heating mantle and continuing to stir the contents of the flask. Upon cooling, the concentrate formed a viscous, translucent gel having the characteristics of an oil-in-water or water-continuous phase emulsion. When an electric current was passed through the concentrate the measured resistance using an Ohm meter resulted in readings similar to those observed in known oil-in-water emulsions. A typical water-in-oil emulsion, in contrast, would show a resistance to current flow so high that it would not be measurable with an ohm meter.

Further, during cooling the gel began to soften and disperse into the water phase. When the temperature dropped below the cloud point of Emulsifier I, an emulsion formed which had a fine particle size averaging about 0.53 microns. Visual inspection of the emulsion as it ran down the sides of a sample jar revealed that the emulsion had a bluish translucent cast to it.

COMPARATIVE EXAMPLE A: CONTROL

An aliquot of the ingredients (emulsifier, oil, surfactants, and water) used in Example 1 was removed after blending but prior to heating the contents in the flask. The aliquot was unstable and the components separated. That is, a simple blending of the components of Example 1 did not produce the desired oil-in-water emulsion.

EXAMPLE 2

The process of Example 1 was repeated, except that while maintaining a 1:1 mole ratio of the Emulsifier I to Oil #2, a concentrate was prepared such that it contained 8.5% solids. The final emulsion had a bluish cast as described in Example 1 and had an average particle size of 4.4 microns.

EXAMPLE 3

The process of Example 1 is repeated, except that while maintaining a 1:1 mole ratio of Emulsifier I to Oil #2, a concentrate was prepared such that it contained 38% solids. The final emulsion had a bluish cast as described in Example 1 and an average particle size of 2.2 microns.

EXAMPLE 4

The process of Example 1 was repeated, except that, while maintaining a 1:1 ratio of Emulsifier I to Oil #2, a reduced amount of water was employed such that the prepared emulsion contained 70.4% solids. The final emulsion was a viscous, translucent gel and had a high electrical conductivity indicating that it was an oil-in-water emulsion, having a particle size of about 0.25 microns or less.

EXAMPLES 5 THROUGH 8

In carrying out these Examples 5 through 8, Examples 1 through 4, respectively, were repeated except that Tergitols 15-S-15 and 15-S-3 were omitted. These examples demonstrate that these non-ionic surfactants are not required for emulsion preparation in the process of the present invention. The results are set forth in Table 1.

TABLE 1

| Example No. | 1 | 2 | 3 | 4 | 5 | 6 | 7 | 8 |
|---|---|---|---|---|---|---|---|---|
| % Solid | 41.1 | 8.5 | 38 | 70.4 | 42.0 | 10.1 | 35.7 | 72.3 |
| Particle size, m | 0.53 | 4.4 | 2.2 | 0.25 | .61 | 6.3 | 1.1 | .25 |
| Shelf life,* mos. | 9 | 1 | 9 | 1 | 3 | 1 | 9 | 1 |

*Shelf life is the period of time the respective emulsions were stored at ambient temperature prior to use.

EXAMPLES 9 THROUGH 11

These examples illustrate that the order of addition of the individual components in the process of the present invention is not critical to formation of the resulting emulsion. Examples 9 through 11 were carried out as described for Example 5, except that the order of addition was varied. In Example 9, the order of addition was oil, emulsifier, then water. In Example 10, the order of addition was water, emulsifier, then oil. In Example 11, the order of addition was water, oil, then emulsifier. There was no noticeable change in the emulsions during processing or in the final products. The emulsions were stable and particle sizes of the emulsions of Examples 9, 10 and 11 were 0.41, 0.64, and 0.60 microns, respectively.

EXAMPLES B THROUGH I AND 12 THROUGH 24

Examples 12 through 24 illustrate mixing conditions for the process of the present invention. The emulsions of Examples B through I and 12 through 24 were prepared in accordance with Example 5. A jacketed glass vessel having a circulating oil bath to heat the contents of the vessel was used. The contents of the vessel were agitated using a variable speed Lightning Mixer ™ equipped with a 3-inch Cowles impeller. The speed of the mixer was varied in order to change the maximum shear rate. Each example was evaluated upon its appearance and shelf life stability. Examples B through H illustrate that below a maximum shear rate of 450 sec.$^{-1}$, the emulsions on visual inspection had a grayish appearance and separated soon after preparation. Emulsions (Examples 12 through 24) made at a maximum shear rate ranging from 450 to 1050 sec.$^{-1}$ were stable and appeared milky white with a bluish translucent cast while draining down the sides of a glass sample jar. An emulsion (Example I) prepared at a maximum shear rate of 1100 sec.$^{-1}$ or higher did not separate immediately. However, the emulsion of Example I was stable for about one week and did not possess the bluish cast associated with a fine particle size emulsion. The results are set forth in Table 2.

TABLE 2

| Example* No. | Maximum Shear Rate Sec-1 | Color | Shelf Life |
|---|---|---|---|
| B | 100 | Gray | <1 day |
| C | 150 | Gray | <1 day |
| D | 200 | Gray | <1 week |
| E | 250 | Gray | <1 week |
| F | 300 | Gray | <1 week |
| G | 350 | Gray | <2 weeks |
| H | 400 | Gray | <2 weeks |
| 12 | 450 | Milky white w/bluish cast | >1 month |
| 13 | 500 | Milky white w/bluish cast | >1 month |
| 14 | 550 | Milky white w/bluish cast | >1 month |
| 15 | 600 | Milky white w/bluish cast | >1 month |
| 16 | 650 | Milky white w/bluish cast | >2 months |
| 17 | 700 | Milky white w/bluish cast | >2 months |
| 18 | 750 | Milky white w/bluish cast | >2 months |
| 19 | 800 | Milky white w/bluish cast | >2 months |
| 20 | 850 | Milky white w/bluish cast | >2 months |
| 21 | 900 | Milky white w/bluish cast | >2 months |
| 22 | 950 | Milky white w/bluish cast | >2 months |
| 23 | 997 | Milky white w/bluish cast | >2 months |
| 24 | 1050 | Milky white w/bluish cast | >1 month |
| I | 1100 | Gray | <1 week |

*Particle size was not measured for these examples.

EXAMPLES 25 THROUGH 27 AND EXAMPLE J

The emulsions of Examples 25 through 27 and Example J were prepared in accordance with the procedure of Example 1, except that Oil #1 replaced Oil #2 and the emulsions contained varying amounts of solids level. The results are set forth in Table 3 below. As shown in Table 3, the emulsion of Example J was found to be unstable. It is not clear what caused the emulsion of Example J to be unstable. However, it is theorized that the emulsion of Example J was unstable because the mixing apparatus employed in the examples was insufficient to impart the required agitation during heating due to the amount of water used in the preparation of the mixture.

TABLE 3

| Example No. | Solids Level | Color | Particle Size | Ability to Conduct Electrical Current (microns) | Stability |
|---|---|---|---|---|---|
| 25 | 49.8 | Milky/blue cast | 0.56 | Yes | Yes |
| 26 | 68.3 | Milky/blue cast | 0.53 | Yes | Yes |
| 27 | 73.7 | Clear/blue cast | 0.25 | Yes | Yes |
| J* | 7.65 | Milky/gray cast | 22.69 | Yes | No |

*The emulsion was unstable after aging for about two weeks.

EXAMPLE 28

The procedure of Example 5 was followed, except that the flask was heated to a temperature of 50° C. The contents of the flask were held at that temperature for 30 minutes. The emulsion was an oil-in-water emulsion of similar quality to that described in Example 5 and had a milky/bluish cast and a particle size of 0.46 microns. This example illustrates that fine stable oil-in-water emulsions can be readily prepared by heating alone, i.e., without pasteurization.

EXAMPLE 29

The procedure of Example 1 was followed, except that Emulsifier II having a cloud point of 73° to 81° C. was used instead of Emulsifier I. The contents of the vessel were heated to 92° C. for 37 minutes to form the gel or concentrate phase. Upon cooling the emulsion was milky white with a bluish cast. Analysis of the gel resulted in a percent solids content of 70–75%.

EXAMPLE 30: PASTEURIZATION

An emulsion was prepared in accordance with the procedure of Example 1. However, the emulsion was inoculated with 5 million colony-forming units (CFU) of bacteria and allowed to stand for one week. After one week, the emulsion was analyzed for sterility. The bacteria count showed that the bacteria (microbe) level was Too Numerous To Count (TNC). The product was heated to 70° C. for 30 minutes to pasteurize the emulsion. Upon heating the emulsion broke up and formed into a gel phase and an aqueous phase. However, as the emulsion was cooled it was reconstituted by low shear blending or mixing. Re-analysis by standard plate count for sterility showed that the emulsion was free of microbial contamination.

EXAMPLE 31: EFFECT OF ALKALINE METAL SALT

In order to illustrate the requirement that a minimum concentration of alkaline metal salt is required, an emulsion was prepared using starting materials free of metal salt as follows: 41.3 grams of Emulsifier I having a cloud point of 38° −42° C. and 41.3 grams of Oil #2 were charged to a three-necked, round bottom flask equipped with an air-driven stirrer, condenser and a temperature controller. The two components were blended together using a stirrer at low speed to agitate the mixture. While maintaining the agitation, 97.4 grams of water free of alkaline metal salt and obtained by a reverse osmosis water purifier manufactured by Millipore Corporation, 2.5 grams of a nonionic surfactant Tergitol 15-S-15 and 1.7 grams of nonionic surfactant Tergitol 15-S-3 were added to the blend.

After the above components were charged to the flask, the mixture was heated to 50° C. When agitation was stopped and heating discontinued, the ingredients separated rapidly and there appeared to be no visual change in the appearance of the components.

The components were again heated to 50° C. Upon reaching 50° C., there was added slowly with continuous agitation a 0.8 wt. % aqueous solution of sodium bicarbonate from a burret.

After 1.82 ml. of sodium bicarbonate solution were added, corresponding to 78 parts of sodium bicarbonate per million parts of mixture, the appearance of the mixture changed abruptly. A gel phase formed which resembled the viscous concentrate or gel identified in Example 1.

Upon cooling to room temperature, the gel phase softened and dispersed into the aqueous phase to form a milky emulsion with a bluish tint or cast and the emulsion was stable.

EXAMPLE 32: REPLACEMENT OF POLYSILOXANE OIL WITH AN ORGANIC OIL

The procedure of Example 1 was repeated, except that Oil #2 was replaced with a mineral oil (nominally 24 centistoke) commonly identified as "baby oil" available from Johnson & Johnson Company. The mineral oil used in this example is further described as a branched paraffinic saturated hydrocarbon oil. A milky white emulsion with a bluish cast and having a particle size ranging from less than 0.25 microns to over 4.0 microns was produced. Photomicrographs indicated that the bulk of the emulsion consisted of small droplets (approximately 0.6 microns) with a few large droplets (approximately 4.0 microns). The emulsion was stable for a period of about two weeks before noticeable separation began to occur. When the emulsion of this example was applied to facial tissue at a rate of 1.5% combined silicone emulsifier and mineral oil, the softness of the tissue was substantially the same as for an emulsion of Example 1; and the mineral oil treated tissue did not smear when used to wipe a glass slide.

What is claimed is:

1. A process for preparing an oil-in-water emulsion comprising:
   (1) mixing and heating
      (i) mineral oil,
      (ii) a water soluble organomodified polysiloxane emulsifier,
      (iii) water, and
      (iv) an alkaline metal salt, above the cloud point of the emulsifier to form a mixture; and
   (2) cooling the resulting mixture below the cloud point of the emulsifier.

2. The process of claim 1 wherein the mixture is heated at least 5° C. above the cloud point of the emulsifier.

3. The process of claim 1 wherein mixing and heating is carried out sequentially.

4. The process of claim 3 wherein the alkaline metal salt is dissolved in the water prior to being combined with the oil and the emulsifier.

5. The process of claim 4 wherein the alkaline metal salt is a water soluble inorganic salt of an alkali or alkaline earth metal.

6. The process of claim 5 wherein the salt is selected from the group consisting of sodium bicarbonate, potassium bicarbonate, and mixtures thereof.

7. The process of claim 4 wherein the mixture is mixed prior to heating and during cooling using low shear mixing, causing volumetric displacement of between 0.2 liter/minute/liter of mixture to 16 liter/minute/liter of mixture.

8. The process of claim 1 wherein mixing and heating is carried out simultaneously.

9. The process of claim 1 wherein mixing during heating is effected by applying agitation to impart a maximum shear rate between about 450 sec.$^{-1}$ to 1050 sec.$^{-1}$ to the mixture.

10. The process of claim 1 wherein the organomodified silicone emulsifier has the formula

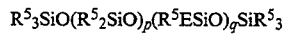

wherein:

$R^5$ is the same or different and comprises a monovalent hydrocarbon group having 1 to 10 carbon atoms; $\underline{p}$ is from 10 to 150; $\underline{q}$ is a number having an average value from 3 to 12; E has the formula $-C_xH_{2x}(OC_2H_4)_y(OC_3H_6)_zOR^6$, wherein x has a value from 1 to 8; $\underline{y}$ is a positive number; and $\underline{z}$ is zero or a positive number; and $R^6$ is an alkyl group having 1 to 8 carbon atoms or an acyl group having 2 to 8 carbon atoms.

11. The process of claim 1 wherein a minor portion of the $R^5$ groups are ethylcyclohexylene-monoxide.

12. The process of claim 1 wherein the mixture contains at least one non-ionic surfactant.

13. The process of claim 1 wherein the mixture is pasteurized.

* * * * *